(12) United States Patent
Jackson

(10) Patent No.: US 8,036,228 B2
(45) Date of Patent: Oct. 11, 2011

(54) QOS AWARE EXPANSION MECHANISM

(75) Inventor: Martin K. Jackson, Haverhill (GB)

(73) Assignee: Conexant Systems UK Limited, Bristol (GB)

( * ) Notice: Subject to any disclaimer, the term of this patent is extended or adjusted under 35 U.S.C. 154(b) by 1736 days.

(21) Appl. No.: 10/940,497

(22) Filed: Sep. 13, 2004

(65) Prior Publication Data

US 2005/0030950 A1    Feb. 10, 2005

(51) Int. Cl.
H04L 12/56    (2006.01)

(52) U.S. Cl. .................... 370/395.43; 370/401

(58) Field of Classification Search ............ 370/395.6
See application file for complete search history.

(56) References Cited

U.S. PATENT DOCUMENTS

| | | | |
|---|---|---|---|
| 5,193,088 A * | 3/1993 | Choi et al. ................ | 370/398 |
| 5,237,569 A * | 8/1993 | Sekihata et al. ........... | 370/394 |
| 5,351,043 A * | 9/1994 | Hullett et al. ............. | 370/412 |
| 5,524,254 A * | 6/1996 | Morgan et al. ............. | 370/402 |
| 5,600,645 A * | 2/1997 | Boyer et al. ............... | 370/395.4 |
| 5,771,350 A * | 6/1998 | Kim ........................... | 370/905 |
| 5,841,777 A * | 11/1998 | Cohen ....................... | 370/443 |
| 5,920,561 A * | 7/1999 | Daniel et al. .............. | 370/395.6 |
| 5,933,425 A * | 8/1999 | Iwata ........................ | 370/395.43 |
| 5,940,370 A * | 8/1999 | Curtis et al. ............... | 370/231 |
| 5,982,748 A * | 11/1999 | Yin et al. ................... | 370/232 |
| 5,999,518 A * | 12/1999 | Nattkemper et al. ........ | 370/402 |
| 6,088,355 A * | 7/2000 | Mills et al. ................ | 370/392 |
| 6,104,721 A * | 8/2000 | Hsu .......................... | 370/431 |
| 6,157,614 A * | 12/2000 | Pasternak et al. .......... | 370/236 |
| 6,185,197 B1 * | 2/2001 | Cheung Yeung et al. .... | 370/401 |
| 6,195,346 B1 * | 2/2001 | Pierson, Jr. ................. | 370/352 |
| 6,195,714 B1 * | 2/2001 | Li et al. ..................... | 370/395.61 |
| 6,212,163 B1 * | 4/2001 | Aida .......................... | 370/395.43 |
| 6,331,987 B1 * | 12/2001 | Beser ........................ | 370/486 |
| 6,535,505 B1 * | 3/2003 | Hwang et al. .............. | 370/401 |
| 6,538,987 B1 * | 3/2003 | Cedrone et al. ............ | 370/216 |
| 6,538,992 B1 * | 3/2003 | Subbiah et al. ........... | 370/395.64 |
| 6,556,542 B1 * | 4/2003 | Sudo et al. ................ | 370/236.1 |
| 6,560,196 B1 * | 5/2003 | Wei .......................... | 370/230.1 |
| 6,643,288 B1 * | 11/2003 | Santhanakrishnan ...... | 370/395.1 |
| 6,804,227 B1 * | 10/2004 | Sone et al. ................ | 370/395.41 |
| 6,937,566 B1 * | 8/2005 | Forslow .................... | 370/231 |

OTHER PUBLICATIONS

Compaq, Intel, Microsoft and NEC; "Universal Serial Bus Specification" Revision 1.1; Sep. 23, 1998.
IEEE Std 1394-1995, "IEEE Standard for a High Performance Serial Bus," 1995.

* cited by examiner

*Primary Examiner* — Chirag Shah
*Assistant Examiner* — Joshua Smith
(74) *Attorney, Agent, or Firm* — Jackson Walker L.L.P.; Christopher J. Rourk

(57) ABSTRACT

In a data communication system comprising a plurality of peripherals having respective interfaces, the interfaces having device drivers and being coupled to a common bus for communication with a management system, the interfaces having different real time requirements; an ATM SAR and scheduler employs a predefined PHY level interface with different levels of service, the PHY interface being used as a QOS (Quality of Service) aware common master-slave bus for the peripherals which act as slave devices, whereby respective device driver requirements can be simplified or eliminated. A predefined PHY level interface is the ATM Forum UTOPIA, each peripheral being addressed as a separate UTOPIA slave port. The invention discloses how a system required to support interfaces with differing real time requirements may be supported through the use of a common bus.

16 Claims, 1 Drawing Sheet

QOS AWARE EXPANSION MECHANISM

Figure 1:
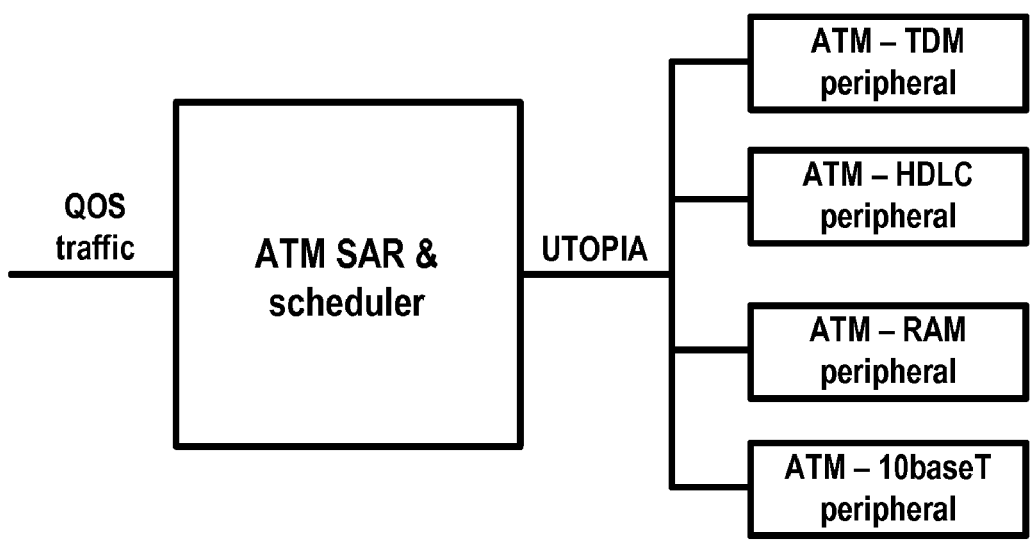

The invention discloses how a system required to support interfaces with differing real time requirements may be supported through the use of a common bus.

It is well established that systems, consisting of subsystems, may be constructed through the use of busses or switched star networks. Bus systems such as Multibus, SCSI, ISA and PCI have been used to connect subsystems or individual devices. The disadvantage of these busses is that they have no explicit provision for quality of service and consequently when subsystems or chips are connected with such busses it is incumbent upon the processor(s) to be aware of the properties of such sub-systems. This means that a simple modular approach to expanding a system is not possible because the addition of a new device will require consideration with respect to every other device in the system. This means that as the range of supported functions grows there is an exponential increase in the complexity of testing and design.

There are busses which have been designed to support quality of service and examples of these include USB and IEE1394 (which are publicly available standards kept by the respective organisations on the net at www.usb.org and www.ieee.org). These busses have typically been designed to operate between large subsystems and use a serial interface to minis the number of interface pins required. Typically they have only supported the two traffic types; isochronous and asynchronous. This does reduce the complexity from that of non QOS aware busses but, with the advent of devices requiring wider QOS, still represent a significant burden.

A system comprises both hardware and software components for each of the interfaces that it supports. The system's processor(s) usually run an operating system and device drivers which are written especially for each interface. A device driver has several functions to perform;
  (i) Initialisation of interface
  (ii) Data transport to and from interface
  (iii) Management of interface These functions will usually have different constraints on rate of interaction by the processor. For example initialisation is usually a one off activity which must be completed before the interface is operational. Data transport is a real time activity whose characteristics depend upon the interface and the type of data being supported. Management of die interface will depend upon the complexity of the interface, the frequency of requests from a management system, etc.

Therefore a particular device driver has to be written to consider the different real time constrains of the interface. The device driver then has to be considered as part of the overall system and one of the important considerations is what other device drivers are present. It is usual for a system to have a set of interfaces which have conflicting requirements and the resultant complexity leads to increased integration, test and debug times.

It is an object of this invention to address and overcome these limitations of complexity, testing and limited QOS awareness.

The invention is defined by the accompanying claims.

Embodiments of the invention will now be described, by way of exile, with reference to the accompanying drawing, in which;

FIG. 1 schematically illustrates a system embodying the invention.

A general description will first be given of the background to the invention. ATM is a networking technology which is widely used to support applications which have differing quality of service requirements. The numerous standards, produced by bodies such as the ATM Forum and ITU, describe how applications may request differing degrees of quality of service using, at the most fundamental level, cells with predefined fields; these fields are used by the end points and intermediate nodes to route the cells, assure their quality of service and provide feedback about the state of the intervening network.

The ATM Forum has defined a PHY level interface UTOPIA (which is a standard ATM interface, the specification for which is available from the ATM forum at www.atmforum.com, reference No. af-pby0017.00 (UTOPIA 1) and af-phy-0039.00 (UTOPIA 2) which can be used to couple ATM systems together. The UTOPIA level 2 specification describes a master-slave bus in which a single master device may communicate with up to 31 slave devices. UTOPIA has been defined in both serial and parallel variants with both in-band and out-of-band control.

The invention proposes to use PHY level interfaces, such as UTOPIA, as a QOS aware bus. The use of such a bus in combination with ATM quality of service features, as supported by many standard devices, enables a system to be developed which addresses the problem of delivering traffic, with quality of service, in a scalable and testable manner. This re-partitioning of functions within the system allows simpler peripherals whilst providing an internally consistent framework for the development of device drivers.

Referring now to FIG. 1, each of the peripherals 1 is addressed by the ATM SAR & scheduler 2 as a separate UTOPIA slave port. The ATM SAR & scheduler device provides pacing functions for the interface using all of the available ATM traffic classes. For example many commercial devices will provide UBR and CBR traffic which, in the context of this invention, may be thought of as asynchronous and synchronous traffic. The use of standard ATM scheduling techniques allows well understood mechanisms to be used to schedule traffic over the UTOPIA bus; if the scheduler implements other traffic classes, for instance VBR, then it becomes possible for the design of the peripherals to be simplified because the QOS properties allow the peripheral logic to be minimised and the design of the device driver simplified.

With a system there are many possible peripherals and the following describe a subset of these possibilities in more detail.

TDM Interface

Time Division Multiplex (TDM) interfaces establish a frame structure within which channels are established; in each frame a channel consists of a number of bits, typically eight. The number of channels is dependent upon the frame interval. Operations for a TDM interface consist of allocating channels to timeslots within a frame and the multiplexing/demultiplexing of channel data within an assigned timeslot.

In conventional systems a TDM interface is constructed from timing logic, serialisation logic, a multi-channel DMA controller and arbitration logic to a memory system. The device driver for such an interface manages the initialisation, transfers, etc. and will usually do so in a manner which is unique to interface logic or chip.

Using the invention both the hardware and software of a TDM interface can be considerably simplified. The hardware can be reduced to, for example, a UTOPIA interface, frame timing logic and serialisation function.

From a software point of view the overall TDM interface may be considered as a CBR stream of data. The remainder of the TDM interface may now be constructed entirely using ATM constructs such as switching QOS, SAP, etc. Simple ATM SAR and scheduling devices may only support the basic CAR stream in which case other software within the system will be required to implement the channel multiplexing/demultiplexing fictions. More sophisticated ATM SAR and scheduling devices will provide broader greater support further simplifying the software. Overall the ability to use ATM constructs in allocating system resources allows a repartitioning of the design which simplifies test, interoperability and debugging. The repartitioning of the hardware allows central resources, such as memory, to be shared more efficiently. Advantages to the system designer are that the common core of processor, and scheduler may be augmented by very simple external hardware blocks which can be implemented, for example, in small FPGAs (for development) or ASICs (for deployment).

HDLC Interface

HDLC interfaces are synchronous serial interfaces which embed packets of variable length within the data stream. The packet boundaries are marked by flags with a unique pattern; bit stuffing/unstuffing logic is used to ensure that data patterns which might match the flag or abort sequences are not passed. Packets may be up to 65536 bytes long.

In conventional systems an HDLC interface is constructed from timing logic, serialisation logic, packet buffers and, usually a DMA controller, etc. to transfer the data to/from a memory system. Using the invention the hardware can be simplified to timing logic, serialisation logic and a small number of cell buffers.

From a software point of view the HDLC interface may be considered as a VBR stream of data with peak cell rate PCR) equal to the HDLC controller's line rate and the burst size equal to the packet length. Other considerations are similar to those of the TDM interface leading to simplified peripherals, more efficient use of central system resources and a well defined set of constructs from which to build the device driver. Again one of the important points is that device drivers may now be developed within a consistent architecture independently leading to simpler system integration, test and maintenance.

It is important to note that although peripheral functions have been described that are very simple there is an opportunity to have slightly more complicated devices which can take further advantage of ATM functions. For example in the case of the simple peripheral functions described so far the ATM cell header has not been utilised at all—at the most basic level data streams are being multiplexed over a QOS aware bus. However, by utilising, for example, the VPI/VCI field as the HDLC address the driver software may be both simplified and extended to offer quality of service for individual packets to specific addresses. Thus a simple and elegant means has been provided to extend existing functions. To accomplish this with a conventional system would considerable redesign work.

RAM Interface

Systems may consist of multiple processors which require to communicate with one another. For example a router may have additional processors to support video (MPEG, etc) or voice (G.711, etc). The most convenient way to implement the communication between processors is to use a shared memory. In the examples given the data is a continuous stream and device drivers have to be constructed to pass these streams of data between the processors.

The invention supports shared memory systems with their associated real time streaming requirements. For example, the ATM VPI/VCI fields may be redefined to be addresses within a shared memory leaving the other flow control fields to provide interlocks between the processors. The traffic class that the ATM SAR and scheduler implements will depend upon the stream requirements—for MPEG and G.711 only CBR streams would be required. An example embodiment includes a system wherein a dual ported memory is constructed by using ATM cell VPI/VCI fields as the address of location(s) within the dual ported memory.

Once again the advantage is that there is a consistent, QOS aware environment within which to develop both the interface hardware and its associated device driver.

Ethernet Interface

Ethernet interfaces are synchronous serial interfaces that transmit packets of data; the packet length depends upon the speed of the interface and whether or not the interface supports priorities or quality of service (IEEE 802.1p and 802.1q).

Typically peripherals have to have sufficient memory to contain a complete Ethernet packet because once a transmission starts data must be delivered at the Ethernet line rate otherwise the packet will become corrupted. If the invention is used then the scheduler can be programmed to implement a VBR traffic class with a PCR equal to the Ethernet line rate and a burst size equal to the longest Ethernet packet. In such a system it would only be necessary for the peripheral device to have two cells (96 bytes) of buffering instead of a more usual two packets (~3000 bytes)—the ATM SAR and scheduler provides centralised storage and scheduling services. The reduced complexity of the peripheral device allows easier testing and the opportunity to integrate more such peripherals. This also provides a natural mechanism for supporting quality of service on the Ethernet interface itself—an important consideration as the quality of service becomes more pervasive.

In a system where the UTOPIA, or equivalent, bus is internal it is unnecessary for the peripheral to use the predefined fields in the ATM cell at all. The peripheral is addressed by the UTOPIA port number. In come instances it may further simplify the peripheral design to use these fields for other purposes. For example if a dual ported memory is being constructed using the technique then the ATM cell VPI/VCI fields can be used as the address of location(s) within the dual ported memory. This would be important, for example, when an MPEG decoder was being addressed and the video stream has to be delivered with a guarantee QOS in order to maintain the decoder's picture quality.

Thus it can be seen that by redistributing functions required by peripherals it is possible to simplify the peripheral device design leading to lower cost and size, share centralised resources more effectively, provide an expansion mechanism which is easily expanded to cater for different service requirements. For ATM SAR and Schedulers which have greater processing power it also becomes possible to consider implementing more of the peripheral functionality in software leading to more adaptable solutions.

The invention claimed is:

1. A system, comprising:
   a plurality of peripheral devices, each of the plurality of peripheral devices configured to specify its minimum quality of service (QOS) level; and
   a physical layer device coupled to the plurality of peripheral devices, the physical layer device configured to assign the minimum QOS level for each of the plurality of peripheral devices and schedule services to meet the assigned QOS level for each of the plurality of peripheral devices,
   wherein at least one of the plurality of peripheral devices is a Time Division Multiplexing (TDM) peripheral device, wherein in hardware, the TDM peripheral device utilizes a physical (PHY) level interface for frame timing logic and serialization, and in software, the TDM peripheral device is configured to treat a TDM interface as a constant bit rate (CBR) stream of data, and wherein at least one of the plurality of peripheral devices is an HDLC peripheral device, wherein in hardware, the high-level data link control (HDLC) peripheral device uses the PHY level interface as a bus to simulate timing logic, serialization logic and cell buffers, and in software, the HDLC peripheral device is configured to treat the HDLC interface as a variable bit rate (VBR) stream of data with peak cell rate (PCR) equal to the HDLC controller's line rate and with burst size equal to packet length.

2. A system according to claim 1, wherein the physical layer device comprises an asynchronous transfer mode (ATM) segmentation and reassembly (SAR) and scheduler device.

3. A system according to claim 2, wherein the ATM SAR and scheduler provides pacing functions for the plurality of peripherals according to predefined ATM traffic classes.

4. A system according to claim 3, wherein the ATM SAR and scheduler implements a variable bit rate traffic class.

5. A system according to claim 1, wherein the physical layer device is a master device and each of the plurality of peripherals is addressed by the physical layer device as a separate slave port.

6. A system according to claim 1, wherein the plurality of peripheral devices employ at least two of time division multiplexing (TDM), high-level data link control (HDLC), Ethernet, and shared memory resources.

7. A system according to claim 1, wherein a VPI/VCI field is utilized as an HDLC address to offer quality of service for individual packets to specific addresses.

8. A system according to claim 1, wherein peripheral devices working with shared memory and their associated real time streaming requirements redefine an ATM VPI/VCI field as an address within a shared memory, leaving other flow control fields to provide processor interlocks.

9. A system according to claim 1, wherein at least one of the plurality of devices is an Ethernet peripheral device, the Ethernet peripheral device programming a scheduler to implement a VBR traffic class with a PCR equal to the Ethernet line rate and a burst size equal to the longest Ethernet packet.

10. A system according to claim 1, wherein the predefined PHY level interface is internal and wherein the peripheral is addressed by a respective port number.

11. A system according to claim 1, wherein a dual ported memory is constructed by using an ATM cell VPI/VCI fields as the address of location(s) within the dual ported memory.

12. A system according to claim 1, wherein at least one of the plurality of devices is an MPEG decoder peripheral device, the MPEG decoder peripheral device addressed by the physical layer device and a video stream is delivered with the minimum QOS level to maintain decoder picture quality.

13. A method, comprising:
receiving a minimum quality of service (QOS) level from each of a plurality of peripheral devices;
assigning in a physical layer device the minimum QOS level for each of the plurality of peripheral devices; and
scheduling services to meet the assigned QOS level for each of the plurality of peripheral devices,
wherein at least one of the plurality of peripheral devices is a Time Division Multiplexing (TDM) peripheral device, wherein in hardware, the TDM peripheral device utilizes a physical (PHY) level interface for frame timing logic and serialization, and in software, the TDM peripheral device is configured to treat a TDM interface as a constant bit rate (CBR) stream of data, and
wherein at least one of the plurality of peripheral devices is an HDLC peripheral device, wherein in hardware, the high-level data link control (HDLC) peripheral device uses the PHY level interface as a bus to simulate timing logic, serialization logic and cell buffers, and in software, the HDLC peripheral device is configured to treat the HDLC interface as a variable bit rate (VBR) stream of data with peak cell rate (PCR) equal to the HDLC controller's line rate and with burst size equal to packet length.

14. A method according to claim 13, wherein the physical layer device comprises an asynchronous transfer mode (ATM) segmentation and reassembly (SAR) and scheduler device.

15. A method according to claim 13, wherein an ATM SAR and scheduler further comprising providing pacing functions for the plurality of peripherals according to predefined ATM traffic classes.

16. A method according to claim 13, wherein the physical layer device is a master device and each of the peripherals is addressed by the physical layer device as a separate slave port.

* * * * *